United States Patent [19]

Clark et al.

[11] Patent Number: 5,515,770
[45] Date of Patent: May 14, 1996

[54] PISTON HAVING LASER HARDENED PRIMARY COMPRESSION RING GROOVE AND METHOD OF MAKING SAME

[75] Inventors: Richard J. Clark; Richard K. Clark, both of Gilman; Dennis E. Clark, Onarga, all of Ill.; Richard W. Budd, Detroit; Norman A. Moon, Ann Arbor, both of Mich.

[73] Assignee: Clark Industries, Inc., Gilman, Ill.

[21] Appl. No.: 349,328

[22] Filed: Dec. 5, 1994

[51] Int. Cl.$^6$ .................................................. F16J 1/04
[52] U.S. Cl. ...................... 92/223; 92/231; 92/208; 29/888.049; 123/193.6; 219/121.74
[58] Field of Search ................ 92/222, 223, 231, 92/260; 123/193.6; 29/888.049, 888.043; 219/121.77, 121.74, 121.75

[56] References Cited

U.S. PATENT DOCUMENTS

| | | | |
|---|---|---|---|
| 4,074,616 | 2/1978 | Gale et al. ................................ | 92/222 |
| 4,125,926 | 11/1978 | Gale et al. ........................... | 29/888.049 |
| 4,161,321 | 7/1979 | Hendrixon et al. ...................... | 277/216 |
| 4,299,401 | 11/1981 | McCormick ............................. | 277/216 |
| 4,299,860 | 11/1981 | Schaefer et al. ..................... | 219/121.77 |
| 4,360,956 | 11/1982 | Hiller .......................................... | 92/222 |
| 4,547,650 | 10/1985 | Arditty et al. ...................... | 219/121.77 |
| 4,643,079 | 2/1987 | Brann et al. .............................. | 92/222 |
| 4,899,702 | 2/1990 | Sasaki et al. ............................. | 92/222 |
| 5,285,045 | 2/1994 | Ito et al. ............................. | 219/121.77 |

Primary Examiner—Thomas E. Denion
Attorney, Agent, or Firm—Kajane McManus

[57] ABSTRACT

The piston made in accordance with the teachings herein includes a primary compression ring groove, a bottom and rear wall surface of which are hardened by the method of laser hardening. The method includes the steps of spraying the primary groove with a graphite spray and then directing an angled elliptical in cross section laser beam at the bottom surface of the groove while rotating the cylinder head at predetermined parameters.

12 Claims, 2 Drawing Sheets

PISTON HAVING LASER HARDENED PRIMARY COMPRESSION RING GROOVE AND METHOD OF MAKING SAME

BACKGROUND OF THE INVENTION

1. Field of the Invention

The present invention relates to a piston having a hardened primary compression ring groove and the method of making same. More particularly, the invention relates to the use of a laser in hardening the primary groove.

2. Prior Art

A piston, such as one proposed for use in a locomotive engine, takes much abuse during its function. Further, to keep forces of combustion taking place against a head of the piston, from escaping around the piston, a plurality of compression rings are seated about the circumference of the piston, each ring engaging within a groove for same provided in the circumference of the piston head.

It is known that the land defining a bottom surface of the primary ring groove is stressed significantly because the force of each combustion episode is borne primarily by the first compression ring.

To accommodate the stress placed upon the land defining the bottom surface of the primary groove, the area of the piston head incorporating the primary groove presently is hardened by induction hardening. Such induction hardening effects a large area of the piston head surrounding the ring groove, hardening parts of the piston head to no functional advantage. Rather, such large area hardening has been found to be detrimental to longevity of the piston, often leading to stress cracking of the dome or combustion head surface of the piston.

As will be described in greater detail hereinafter, laser hardening of only the functional area of the primary ring groove defined by the bottom groove surface forming land significantly increases piston head longevity.

SUMMARY OF THE INVENTION

According to the invention there is provided a piston having a head incorporating therein at least a primary circumferential compression ring groove defined by a top surface, a bottom surface and an inset rear wall extending between the top and bottom surfaces, the bottom surface and the rear wall of the groove being laser hardened.

Still further according to the invention there is provided a method of laser hardening at least a portion of a primary circumferential compression ring groove of a piston, the method including the steps of:

coating the groove with a graphite solution;

positioning a laser so that an elliptical beam spot is formed on a bottom surface of the groove, and rotating the piston so the entire circumferential extent of the bottom surface of the groove is intersected by the beam for a predetermined period of time.

DESCRIPTION OF THE PREFERRED EMBODIMENT

Figure 1:
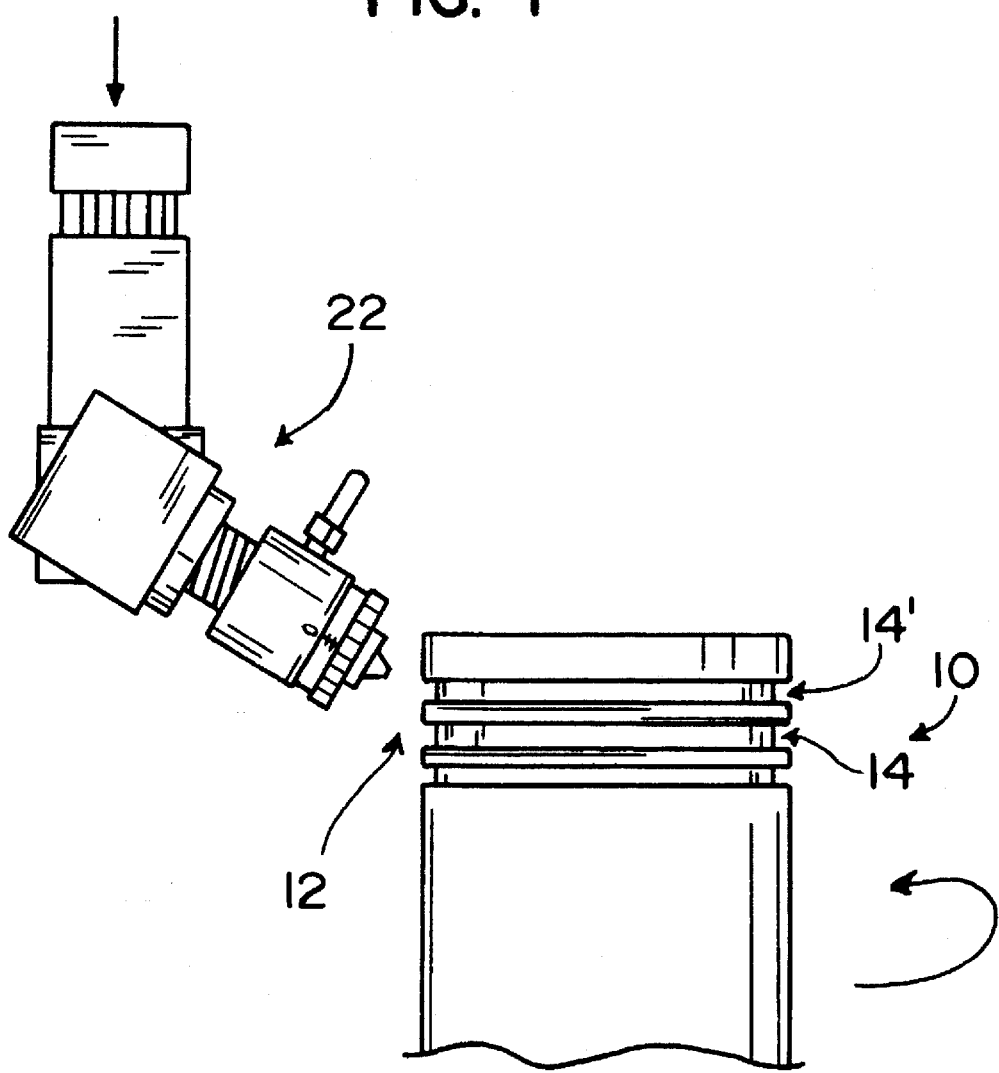
FIG. 1 is a side view of a piston showing a laser being used to harden a primary ring groove thereof in accordance with the present invention.
Figure 2:
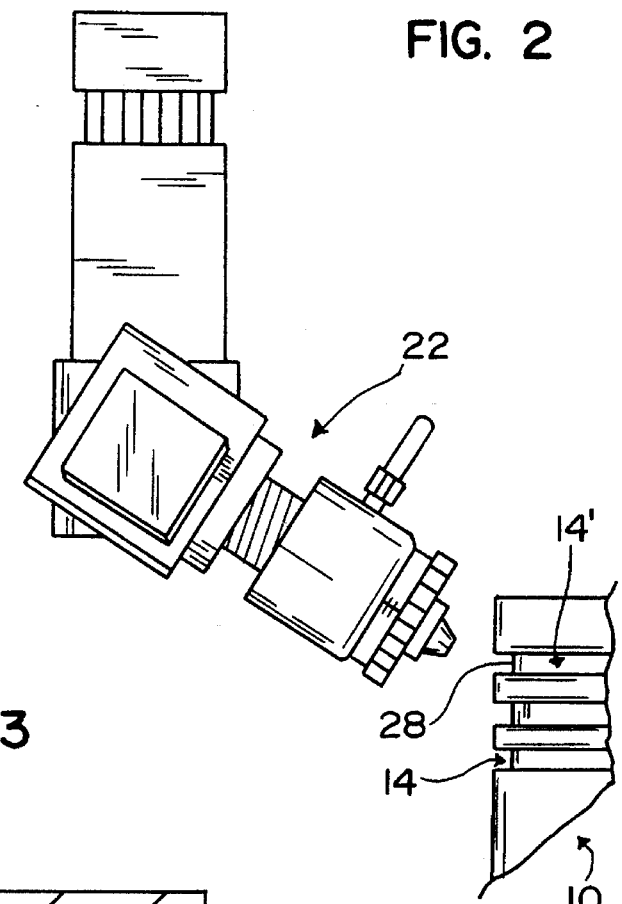
FIG. 2 is a slightly enlarged view similar to FIG. 1.

Referring now to the drawings in greater detail, there is illustrated therein a piston having a laser hardened primary compression ring groove bottom surface defining land, the piston being generally referred to by the reference numeral 10.

As shown, the piston 10 includes a head portion 12 which has a plurality of circumferential grooves 14 therein, a primary one of which is labeled 14'.

This primary groove 14' has a bottom surface 16 which is defined by a primary land 18, the land 18 having chamfered outer corners 20.

Presently, the area of the piston head 12 incorporating this primary compression ring groove 14' is hardened by the process of induction. Such induction hardening causes a brittleness of the metal material, leading to cracking of the piston head 12, as well as to chipping away of the bottom surface 16 of the primary groove 14' in the area adjacent the chamfered corner 20.

The damage is caused, as is known, by the pressure exerted against the primary land 18 by a primary compression ring (not shown) which seats within the primary groove 14', engaging against a wall of the piston cylinder (not shown) for maintaining the forces of combustion taking place against the head 12 confined, generating power to run an engine (not shown).

Thus, the bottom surface 16 of the primary compression ring groove 14' must be hardened to endure the concussive abuse caused thereagainst by the compression ring, without compromising structural integrity of the piston head 12 in the area being hardened.

Such hardening which does not compromise structural integrity of the piston head 12 has been found to be reproducibly accomplished by using a laser 22 which is operable to harden a confined area 24 of the primary groove 14', without causing brittleness in the primary land 18, and without compromising structural integrity of the remainder of the piston head 12.

In this respect, it has been found through empirical testing that a beam may be produced using a $CO_2$ laser which intersects the bottom surface 16 of the primary compression ring groove 14' in a particular manner to produce the precise hardening desired.

The beam is produced to have a wavelength of 10.6 micron, with a mode or shape of a ring referred to as TEM-01. The diameter of the beam at a lens 26 of the laser 22, is 0.75 inch, and is created using 1300 watts of power.

The lens 26 used is made of zinc selenide, having a 1.5 inch diameter and a 15 inch focal length. If the laser 22 were aimed head on, a circular spot or focus of laser light of 0.15 inch diameter would be produced.

Figure 3:
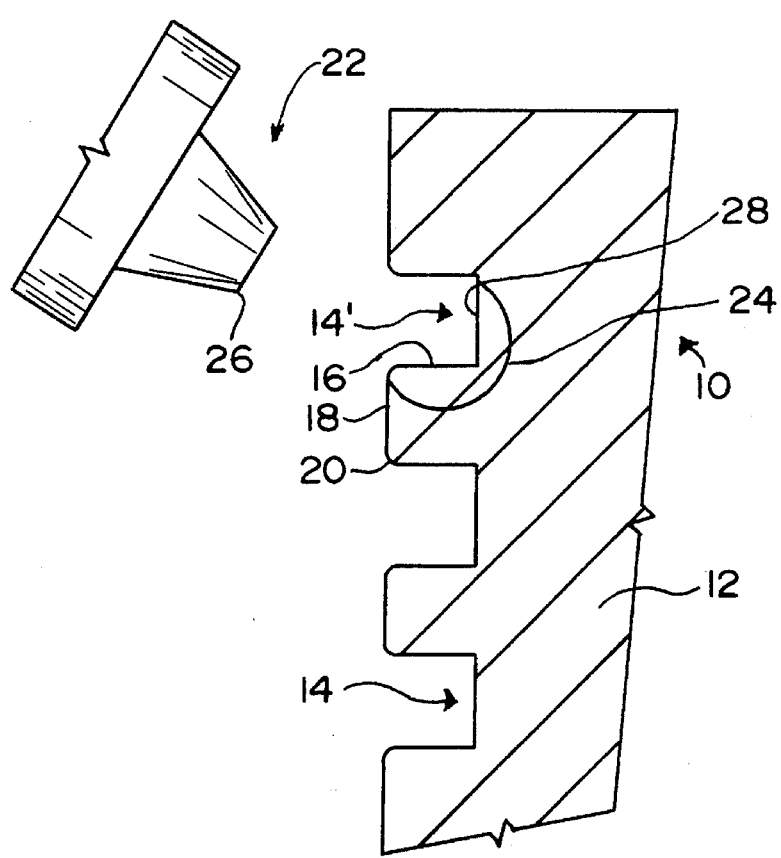
FIG. 3 is an enlarged cross sectional view through the area of the primary compression ring groove showing the land defined area hardened by the laser.

However, such direct aiming is not possible, and it has been found that when the laser lens 26 is angled approximately 32° from horizontal, an elliptical spot measuring approximately 0.15 inch by 0.25 inch is created on the bottom surface 18 of the primary groove 14', hardening the bottom surface 18 in the area 24 shown in FIG. 3.

Further, because of angulation of the beam, a reflection of the beam against a backwall 28 of the groove 14' is created, hardening a significant area thereabout as well also defined within area 24, as shown in FIG. 3.

To enhance beam coupling and to provide a source of carbon which is diffusible into the area 24 of molten metal created by traverse of the laser beam, the primary groove 14' is coated with a graphite spray prior to being treated with the laser 22.

It will be understood that the groove 14' is circumferential and that it is to be treated by laser in its entire circumferential extent. This may be accomplished by known means, such as by placing the piston 10 on a turntable (not shown) and rotating same once, the revolution taking slightly longer than a minute when beam parameters described above are used. It has been found to be desired to create a slight overlap of the starting point during rotation, to accommodate any variations that may be incurred in rotational speed of the turntable.

As described above, the piston 10 of the present invention, together with the method of creating same, provide a number of advantages some of which have been described above and others of which are inherent in the invention. Further, modifications may be proposed to the piston and method without departing from the teachings herein. Accordingly, the scope of the invention is only to be limited as necessitated by the accompanying claims.

We claim:

1. A piston having a head incorporating therein at least a primary circumferential compression ring groove defined by a top surface, a bottom surface and an inset rear wall extending between the top and bottom surface, a portion of the bottom surface toward the rear wall being hardened by direct laser contact and the rear wall of the groove being hardened by reflection of the beam, with the top surface being maintained unhardened.

2. A method of laser hardening a portion of a primary circumferential compression ring groove of a piston, the method including the steps of:

coating the groove with a graphite solution;

positioning a laser so that an elliptical beam spot is formed on a portion of the bottom surface of the groove toward a rear wall of the groove to avoid direct contact between the beam and a chamfered edge of the bottom surface and further to avoid direct contact of the beam and top surface and rear wall of the groove, and rotating the piston about a vertical axis of the piston so the entire circumferential extent of the portion of the bottom surface of the groove is intersected by the beam for a predetermined period of time.

3. The method of claim 2 wherein the laser beam is produced by a $CO_2$ laser.

4. The method of claim 3 wherein the elliptical beam spot is approximately 0.15×0.25 inch.

5. The method of claim 4 wherein the wavelength of the laser beam is 10.6 microns.

6. The method of claim 5 wherein one rotation takes approximately one minute.

7. The method of claim 6 wherein the laser beam is produced using a zinc selenide lens.

8. The method of claim 7 wherein said zinc selenide lens creates a beam having a 0.75 inch diameter at the lens.

9. The method of claim 8 wherein the beam is produced at 1,300 watts of power.

10. The method of claim 9 wherein the focal length of the beam is 15 inches.

11. The method of claim 10 wherein the beam is angled at approximately 32° to the horizontal.

12. The method of claim 11 wherein the rear wall of the groove is hardened by reflection of the beam from the bottom surface.

* * * * *